United States Patent
Zhao et al.

(10) Patent No.: US 9,724,791 B2
(45) Date of Patent: Aug. 8, 2017

(54) AIRCRAFT ENGINE ROTOR ASSEMBLY METHOD AND DEVICE

(71) Applicant: HARBIN INSTITUTE OF TECHNOLOGY, Heilongjiang (CN)

(72) Inventors: Bo Zhao, Heilongjiang (CN); Lei Wang, Heilongjiang (CN); Jiubin Tan, Heilongjiang (CN); Chuanzhi Sun, Heilongjiang (CN)

(73) Assignee: HARBIN INSTITUTE OF TECHNOLOGY, Heilongjiang (CN)

(*) Notice: Subject to any disclaimer, the term of this patent is extended or adjusted under 35 U.S.C. 154(b) by 0 days.

(21) Appl. No.: 15/118,803

(22) PCT Filed: Dec. 26, 2014

(86) PCT No.: PCT/CN2014/095123
§ 371 (c)(1),
(2) Date: Aug. 12, 2016

(87) PCT Pub. No.: WO2015/120749
PCT Pub. Date: Aug. 20, 2015

(65) Prior Publication Data
US 2017/0050275 A1    Feb. 23, 2017

(30) Foreign Application Priority Data
Feb. 14, 2014    (CN) .......................... 2014 1 0052279

(51) Int. Cl.
*B23P 15/04* (2006.01)
*G01B 5/20* (2006.01)
(Continued)

(52) U.S. Cl.
CPC .............. *B23P 15/04* (2013.01); *F01D 5/005* (2013.01); *F01D 5/02* (2013.01); *F01D 25/285* (2013.01);
(Continued)

(58) Field of Classification Search
CPC ......... B23P 15/04; B23P 15/006; B23P 19/10; F01D 5/02; F01D 5/005; F01D 25/285;
(Continued)

(56) References Cited

U.S. PATENT DOCUMENTS 6,668,466 B1 * 12/2003 Bieg ...................... G01B 5/008
33/1 PT
6,850,054 B2 * 2/2005 Kjellin .................. G01D 5/2013
318/721
(Continued)

FOREIGN PATENT DOCUMENTS

CN         1635589 A      6/2005
CN       101799354 A      8/2010
(Continued)

OTHER PUBLICATIONS

International Search Report for WO 2015120749A1 dated Mar. 24, 2015.
(Continued)

*Primary Examiner* — David Bryant
*Assistant Examiner* — Lawrence Averick
(74) *Attorney, Agent, or Firm* — Jenkins, Wilson, Taylor & Hunt P.A.

(57) ABSTRACT

Aircraft engine rotors traditionally have low coaxiality after assembly. This is solved by the methods and devices described herein, having advantages that the rotors have high coaxiality after assembly, reduced vibration, easy installation, high flexibility, and improved engine performance. A measurement method and device use an air flotation rotary shaft system determining a rotary reference. An induction synchronizer determines angular positioning of a turntable. Using a four probe measurement device, a radial error of a rotor radial assembly surface and an inclination error of an axial mounting surface are extracted and an
(Continued)

influence weight value of the rotor on the coaxiality of assembled rotors is obtained. All rotors required for assembly are measured and an influence weight value of each on the coaxiality of the assembled rotors is obtained. Vector optimization is performed on the weight value of each rotor and an assembly angle of each rotor is obtained.

2 Claims, 2 Drawing Sheets

(51) Int. Cl.
    *F01D 25/28*     (2006.01)
    *F01D 5/00*     (2006.01)
    *G01B 5/207*     (2006.01)
    *F01D 5/02*     (2006.01)

(52) U.S. Cl.
    CPC ............ *G01B 5/205* (2013.01); *G01B 5/207* (2013.01); *F05D 2220/323* (2013.01); *F05D 2230/64* (2013.01); *F05D 2250/31* (2013.01)

(58) Field of Classification Search
    CPC ..... G01B 5/205; G01B 5/207; F05D 2230/64; F05D 2220/323; F05D 2250/31; G01M 7/02; G01M 15/00; Y10T 29/37; Y10T 29/49771; Y10T 29/49002; Y10T 29/49321; Y10T 29/53039
    USPC ........... 29/407.01, 407.05, 407.09, 705, 712, 29/889.21, 889.2, 243
    See application file for complete search history.

(56) References Cited

U.S. PATENT DOCUMENTS

| | | | | |
|---|---|---|---|---|
| 6,854,193 | B2* | 2/2005 | Lotze | G01B 11/005 33/502 |
| 8,229,694 | B2* | 7/2012 | Nakagawa | G01B 21/045 702/95 |
| 9,145,945 | B2* | 9/2015 | Tan | F16F 15/023 |
| 9,435,645 | B2* | 9/2016 | Pettersson | G01B 5/008 |
| 2001/0008047 | A1* | 7/2001 | Okada | G01B 5/008 33/503 |
| 2005/0132591 | A1* | 6/2005 | Kojima | G01B 5/08 33/503 |
| 2005/0204571 | A1* | 9/2005 | Mies | B23F 23/06 33/503 |
| 2005/0283989 | A1* | 12/2005 | Pettersson | G01B 21/045 33/502 |
| 2006/0112577 | A1* | 6/2006 | Jones | G01C 15/10 33/366.12 |
| 2007/0028677 | A1* | 2/2007 | McFarland | G01B 21/045 73/105 |
| 2008/0065341 | A1* | 3/2008 | Ishikawa | G01B 21/045 702/95 |
| 2009/0025463 | A1* | 1/2009 | McFarland | G01B 21/045 73/104 |
| 2009/0039874 | A1* | 2/2009 | Kreit | G01D 5/2073 324/207.17 |
| 2011/0102808 | A1* | 5/2011 | Verdi | G01B 5/008 356/614 |
| 2014/0117980 | A1* | 5/2014 | Ely | G01B 7/30 324/207.17 |
| 2014/0374565 | A1* | 12/2014 | Tan | F16F 15/023 248/542 |
| 2016/0033305 | A1* | 2/2016 | Mehnert | G01D 5/2216 324/207.18 |
| 2016/0069662 | A1* | 3/2016 | Mullenix | G01D 5/22 324/207.15 |
| 2017/0097224 | A1* | 4/2017 | Lucas | G01B 7/30 |

FOREIGN PATENT DOCUMENTS

| | | | |
|---|---|---|---|
| CN | 102072696 A | 5/2011 | |
| CN | 102175135 A | 9/2011 | |
| CN | 202024752 U | 11/2011 | |
| CN | 103808251 A | 5/2014 | |
| EP | 2525049 A2 | 11/2012 | |
| GB | EP 2525049 A2 * | 11/2012 | ............ F01D 21/003 |

OTHER PUBLICATIONS

International Preliminary Report on Patentability and Written Opinion for PCT/CN2014/095123 dated Aug. 16, 2016.

* cited by examiner

AIRCRAFT ENGINE ROTOR ASSEMBLY METHOD AND DEVICE

TECHNICAL FIELD

The present invention pertains to the field of mechanical assembly technique, and mainly relates to a method and a device for assembling rotors of aircraft engine.

BACKGROUND ART

The assembly of an aircraft engine is the last procedure during manufacturing of the aircraft engine, and is also one of the most important manufacturing procedures. According to the current condition of designs and processing technology of the aircraft engine, the quality and efficiency of the assembly work have great influence on the quality, performance and production efficiency of the engine. Therefore, coaxiability of the mounted rotors needs to be improved as much as possible during the assembly, so as to further reduce the vibration of the aircraft engine and improve the performance of the aircraft engine. However, the aircraft engines are assembled completely by hand in the actual production, the assembly accuracy and assembly stability depend entirely on the operational experience and technical skills of the workers, Therefore there is a need for a rapid and effective method that is capable of guiding the assembly of the rotors of the aircraft engine so as to increase the assembly efficiency, reduce vibration of the aircraft engine and improve the performance of the aircraft engine.

In recent years, the aircraft engine assembly test technology has attracted more and more attention, and becomes the focus of aircraft engine researches. More and more researchers have been making deep researches on rotors of the aircraft engine. For example, ROLLS-ROYCE PLC proposed a solution (System and method for improving the damage tolerance of a rotor assembly; European Patent Publication No. EP2525049A2), which mainly comprises the steps of obtaining stress signals at each position of the rotor by each sub-system, analyzing the signals collected by each sub-system by a main system, and then analyzing the influence on the assembly from the damage tolerance parameters of each rotors, thereby improving assembly of the rotors of the aircraft engine. Yet, the problem of this method lies in that: it does not analyze the influence on the assembly in terms of the geometric quantities of the rotors, and thus cannot improve the impact of geometric quantities on the assembling.

XI'AN JIAOTONG UNIVERSITY proposed a method for testing the assembling performance of the rotors of the aircraft engine (Method for testing assembling performance of rotor of aircraft engine, Publication No.: CN101799354A). The method can comprise the steps of: firstly exciting a rotor of an aircraft engine to vibrate by means of a vibration exciter; obtaining a multicarrier-coupled impulse response signal of the rotor of the aircraft engine with a vibrating sensor and a signal-acquiring system software; analyzing the obtained multicarrier-coupled impulse response signal of the rotor of the aircraft engine by means of a dual-tree complex wavelet transform, so as to obtain eight single-carrier impulse response signals of the rotor of the aircraft engine; and finally getting the average assembly performance index of the obtained eight single-carrier impulse response signals of the rotor of the aircraft engine, wherein the assembly performance of the rotor of the aircraft engine is determined to be qualified if the average assembly performance index obtained is larger than or equal to 10, and the assembly performance of the rotor of the aircraft engine is determined to be unqualified if the average assembly performance index obtained is less than 10, and the rotor needs to be reprocessed and repaired. The problem of this method lies in that there is no guidance for assembling the rotor of the aircraft engine.

LUOXIN PRECISION PART (SHANGHAI) CO., LTD. proposed a coaxiality measuring device (A Coaxiality Measuring device, Publication No.: CN202024752U). The device comprises a pair of driving spindles, which are arranged on a main body of the instrument and are synchronously controlled by a synchronous mechanism to rotate; a probe and positioning datum planes are respectively and correspondingly arranged at the inner ends of the driving spindles; and a sensor probe is arranged above the position between the probes. It mainly solves the problem on the coaxiality and vibration of precision parts in the prior art. Yet, the detect of this method lies in that it only measures the coaxiality of the measured part, but this to solve the problem of poor coaxiality of the rotors after assembling.

SHENYANG LIMING AERO-ENGINE (GROUP) CO. LTD. proposed a gap measurement method (A non-contact measurement method for the radial gap of the engine rotor blade tips, Publication No. CN102175135A). The method adopts capacitance measurement techniques and comprises the steps of: assembling the measurement system, calibrating the sensor and determining the relationship between the radial gap of the blade tips and the voltage, fixing the sensor on the blade; and measuring the radial gap of the blade tips of the engine rotor. The problem of this method lies in that it does not take the influence of the axial mounting surface on the assembled rotor during the assembly of rotor into account.

The test objects of the assembly of the aircraft engine are stators and rotors of a turbine. In the condition that the processing precision of the parts meets the requirements, the final test result is determined by the fitting state after installation, and the assessment index is mainly the coaxiality parameter of the assembled rotor. Rotation of the engine can produce high pressure, and the rotor of the engine is composed of a plurality of separate parts which are combined together, it is ideal that a rotatory shaft of each part overlaps with an axis of the whole engine. In operation, the high-performance engine has a high speed of rotation of greater than 10000 rpm, so the axial or radial deflection of the single member will inevitably result in deviation of a center of a turbine disk from the rotation axis of the engine. In such a case, a huge centrifugal force will be produced, causing unbalanced rotation of the rotor and vibration of the engine. Therefore, it is important and difficult to guarantee the coaxiality of each part after assembling.

For a model assembly where a coaxiality optimization method is not adopted, there are errors of jitter, eccentricity, inclination in the axial and radial direction of each part due to the limitation of processing precision. If the assembly is performed directly and randomly, a case where a "banana"-like bending is formed may occur. In other words, the upper parts have been accumulated with the eccentricity or inclination error of the lower parts, resulting in great deflection and inclination of the whole model after being assembled, further causing poor coaxiality of the rotor of the engine, and thus it is hard to meet the requirements for use.

At present, the traditional assembly methods are still adopted in the domestic engine assembly, which mainly conducts measurement manually with a dial gauge, wherein the engine is assembled in an order from bottom to top, and measurement is conducted after assembly of each part, so as to ensure that the whole body can meet the threshold value of coaxiality every time after a part is added; and then another part is mounted upwardly. Each new part is mounted by using the previous part as a reference, and the final coaxiality of the whole body is required to be within a certain range. Such a method is time consuming and is very likely to need reprocessing, significantly affecting the mounting efficiency and the success rate of one-time mounting; a successful assembly usually takes 4 to 5 days. Moreover, since the location is not the optimal assembly position, 4 to 5 times of disassembly is usually required. Plus, workers have to conduct assembly based on their experiences, and each assembly needs to go through hot processing and cold processing. Therefore, the current methods for assembling an aircraft engine are low in mounting efficiency, difficult in mounting and poor in coaxiality after assembly, which affects the performance of the engine.

SUMMARY OF THE INVENTION

In view of the above-mentioned drawbacks in the prior art, the present invention proposes a method and a device for assembling a rotor of aircraft engine, so as to solve the problem of low coaxiality of the rotor of aircraft engine after assembly, and to achieve the purposes of having high coaxiality after assembly, reducing vibration, being easy for installation and highly flexible, and improving the performance of the engine.

The object of the present invention is achieved by the following solution.

A method for assembling a rotor of aircraft engine is provided, the method for measurement comprises the steps of: placing and fixing a measured rotor onto a center and inclination adjusting workbench ; making a telescopic inductive sensor for measuring an axial mounting datum plane be in contact with the axial mounting datum plane of the measured rotor, so as to adjust inclination; making a lever-type inductive sensor for measuring a radial mounting datum plane be in contact with the radial mounting datum plane, so as to adjust concentricity; driving the measured rotor to rotate at a uniform speed of 6 r/min to 10 r/min by an air bearing turntable by the center and inclination adjusting workbench; conducting sampling on the axial mounting datum plane of the measured rotor at equal intervals by the telescopic inductive sensor for measuring the axial mounting datum plane, and conducting sampling on the radial mounting datum plane of the measured rotor at equal intervals by the lever-type inductive sensor for measuring the radial mounting datum plane, wherein the number of sampling points falls within the range from 1000 to 2000 points per circle; performing a least square circle fitting on the sampling data of the radial mounting datum plane of the measured rotor so as to evaluate the eccentricity, and performing a least square plane fitting on the sampling data of the axial mounting datum plane of the measured rotor so as to evaluate the inclination; adjusting a center adjusting knob of the center and inclination adjusting workbench according to the size and angle of the eccentricity, and adjusting an inclination adjusting knob of the center and inclination adjusting workbench according to the size and angle of the inclination, until the center and inclination adjusting workbench is adjusted such that an eccentricity of a radial datum plane falls within the range from 0 to 3 µm and an inclination of an axial datum plane falls within the range from 0" to 2"; making a telescopic inductive sensor for measuring an axial mounting measurement surface be in contact with an axial mounting measurement surface of the measured rotor, and making a lever-type inductive sensor for measuring a radial mounting measurement surface be in contact with a radial mounting measurement surface of the measured rotor; rotating the air bearing turntable at a uniform speed of 6 r/min to 10 r/min; conducting sampling on the axial mounting measurement surface of the measured rotor at equal intervals by the telescopic inductive sensor for measuring the axial mounting measurement surface, and conducting sampling on the radial mounting measurement surface of the measured rotor at equal intervals by the lever-type inductive sensor for measuring the radial mounting measurement surface, wherein the number of sampling points falls within the range from 1000 to 2000 points per circle; performing a least square circle fitting on the sampling data of the radial mounting measurement surface of the measured rotor by the lever-type inductive sensor for measuring the radial mounting measurement surface so as to evaluate concentricity, and performing a least square plane fitting on the sampling data of the axial mounting measurement surface of the measured rotor by the telescopic inductive sensor for measuring the axial mounting measurement surface so as to evaluate perpendicularity; obtaining an influence weight value of the measured rotor on the coaxiality of the assembled rotor by combining the radius of the axial mounting measurement surface and a height difference between the measured rotor and a finally-assembled rotor; measuring all rotors required for assembly respectively, so as to obtain the influence weight value of each rotor on the coaxiality of the assembled rotor; and perforating vector optimization on the weight value of each rotor by means of a genetic algorithm, and obtaining an assembly angle of each rotor, wherein the influence weight value of the coaxiality of the rotor is calculated according to the following equation:

$$CoaxWeight = CL\varphi - \frac{H}{R}PL\theta,$$

where C represents the concentricity of the radial mounting measurement surface of the measured rotor; φ represents an eccentric angle of the fitting center of circle of the radial mounting measurement surface; H represents the height difference between the measured rotor and the finally-assembled rotor; R represents the radius of the axial mounting measurement surface; P represents the perpendicularity of the axial mounting measurements surface of the measured rotor; and θ represents an angle at which the highest point of the fitting plane of the axial mounting measurement surface lies.

A device for assembling a rotor of aircraft engine is configured such that an air bearing system is fitted to a central position of a base, the air bearing system comprises an air bearing spindle, a workbench, an air bearing upper platen, an air bearing lower platen, an inductosyn fixed scale, an inductosyn sliding scale, a motor stator and a motor rotor, the workbench is provided on an upper end portion of the air bearing upper platen which is arranged on an upper end portion of the air bearing spindle; the air bearing spindle is provided on an upper end portion of the air bearing lower platen; the inductosyn sliding scale is fitted to an outer ring of the air bearing lower platen, and the inductosyn fixed scale is fixed to a lower portion of an inner side of the central position of the base and is located above the inductosyn sliding scale; the motor stator is fixed to the lower portion of the inner side the central position of the base and is located below the inductosyn fixed scale and outside the motor rotor; the motor rotor is fitted to the outer ring of the air bearing lower platen and is located below the inductosyn sliding scale; the center and inclination adjusting workbench is provided at a central position of the air bearing system; a three-jaw electric chuck is provided in a central position of the center and inclination adjusting workbench; a left motion guide rail and a right motion guide rail are symmetrically distributed on the base at two sides of the air bearing system; a left column is mounted on the left motion guide rail and a right column is mounted on the right motion guide rail; an upper left column-rod connecting piece and a lower left column-rod connecting piece are fitted to the left column sequentially from top to bottom and can be movably adjusted; an upper left transverse measuring rod is horizontally fitted to the upper left column-rod connecting piece and is connected fixedly to an upper lever-type inductive sensor; a lower left transverse measuring rod is horizontally fitted to the lower left column-rod connecting piece and is connected fixedly to a lower lever-type inductive sensor; an upper right column-rod connecting piece and a lower right column-rod connecting piece are fitted to the right column sequentially from top to bottom and can be movably adjusted; an upper transverse measuring rod is horizontally fitted to the upper right column-rod connecting piece and is connected fixedly to an upper telescopic inductive sensor; a lower right transverse measuring rod is horizontally fitted to the lower right column-rod connecting piece and is connected fixedly to a lower telescopic inductive sensor.

Compared with the prior art, the present invention has the following characteristics.

The present invention can obtain the weight value of the coaxiality of each rotor by measuring the concentricity and perpendicularity of each rotor, and then obtain the guiding assembly angle by performing vector optimization on the weight value of the coaxtality of each rotor: in this way, the mounting time and cost can be reduced by 40%, a one-time mounting success rate of 98% can be achieved. The mounting progress can be predicted in advance. Moreover, the stability of the engine can be improved, and vibration of the engine can be reduced. Fuel consumption of the engine can be saved so as to decrease CO2 emission, and the noise pollution of engine can also be reduced.

Figure 1:
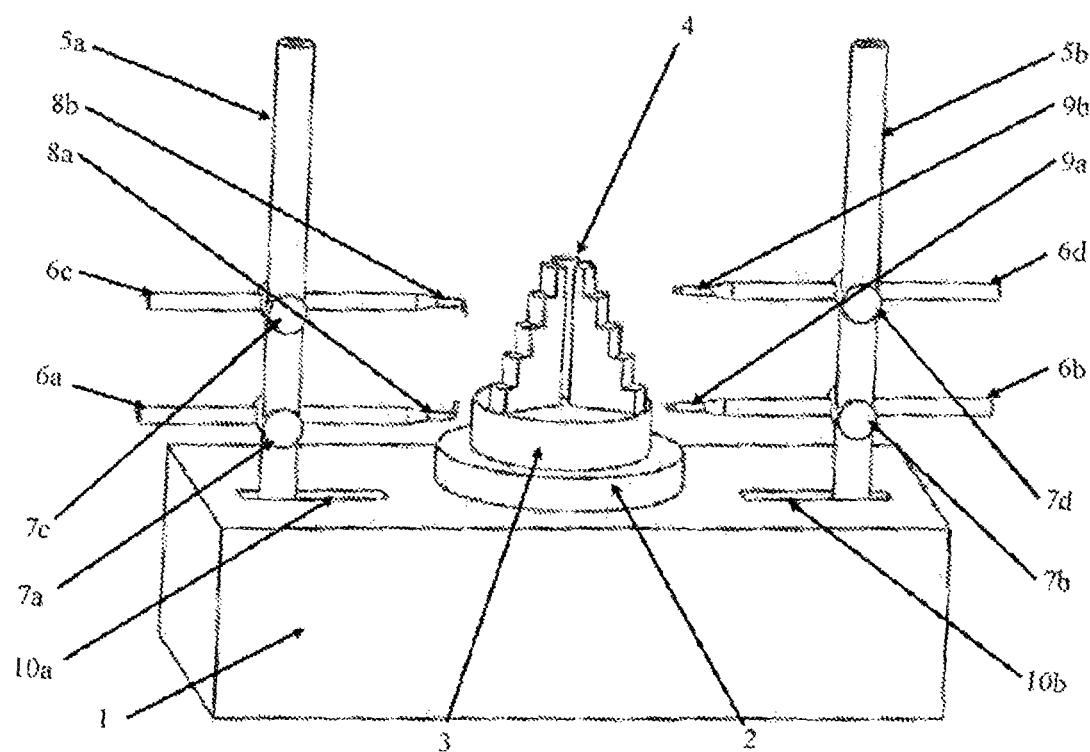
FIG. 1 is a schematic view of a structure of a measurement device having four probes.
Figure 2:
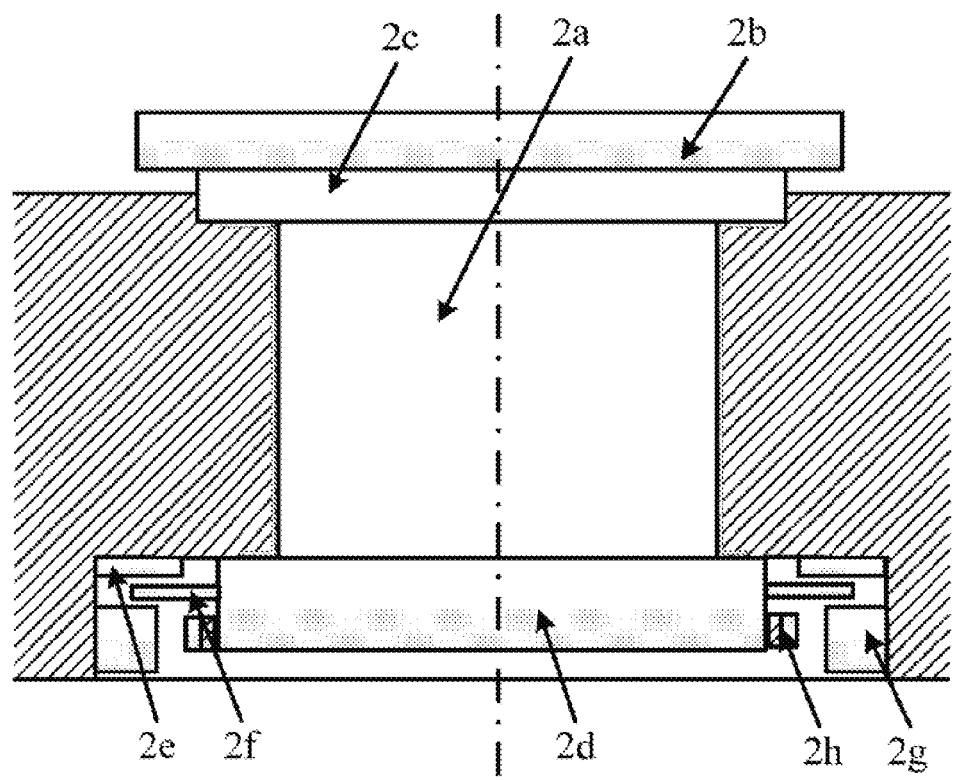
FIG. 2 is a schematic view of a structure of an air bearing system.

Part numbers in the drawings: 1—a base; 2—an air bearing system; 2a—an air bearing spindle; 2b—a workbench; 2c—an air bearing upper platen, 2d—an air bearing lower platen; 2e—an inductosyn fixed scale; 2f—an inductosyn sliding scale; 2g—a motor stator; 2h—a motor rotor; 3—a center and inclination adjusting workbench; 4—a three-jaw electric chuck; 5a—a left column; 5b—a right column; 6a—a lower left transverse measuring rod; 6b—a lower right transverse measuring rod; 6c—an upper left transverse measuring rod; 6d—an upper right transverse measuring rod; 7a—a lower left column-rod connecting piece; 7b—a lower right column-rod connecting piece; 7c—an upper left column-rod connecting piece; 7d—an upper right column-rod connecting piece; 8a—a lower lever-type inductive sensor; 8b—an upper lever-type inductive sensor; 9a—a lower telescopic inductive sensor; 9b—an upper telescopic inductive sensor; 10a—a left motion guide rail; 10b—a right motion guide rail.

DETAILED DESCRIPTION OF THE EMBODIMENTS

The present invention will be further described in details in combination with the drawings.

A method and a device for assembling a rotor of aircraft engine are provided. According the method and the device disclosed, a three-jaw electric chuck 4 is provided at a central position of a center and inclination adjusting workbench 3. A left motion guide rail 10a and a right motion guide rail 10b are symmetrically distributed on the base 1 at both sides of the air bearing system 2, a left column 5a is mounted to the left motion guide rail 10a, and a right column 5b is mounted to the right motion guide rail 10b. An upper left column-rod connecting piece 7c and a lower left column-rod connecting piece 7a are fated to the left column 5a sequentially from top to bottom and can be movably adjusted, an upper left transverse measuring rod 6c is horizontally fitted to the upper left column-rod connecting piece 7c and is connected fixedly to an upper lever-type inductive sensor 8b, and a lower left transverse measuring rod 6a is horizontally fitted to the lower left column-rod connecting piece 7a and is connected fixedly to a lower lever-type inductive sensor 8a. Further, an upper right column-rod connecting piece 7d and a lower right column-rod connecting piece 7b are fitted to the right column 5b sequentially from top to bottom and can be movably adjusted, an upper right horizontal measuring rod 6d is horizontally fitted to the upper right column-rod connecting piece 7d and is connected fixedly to an upper telescopic inductive sensor 9b, and a lower right transverse measuring rod 6b is horizontally fitted to the lower right column-rod connecting piece 7b and is connected fixedly to a lower telescopic inductive sensor 9a. An air bearing system 2 is fitted to a central position of the base 1 and comprises an air bearing spindle 2a, a workbench 2b, an air bearing upper platen 2c, an air bearing lower platen 2d, an inductosyn fixed scale 2e, an inductosyn sliding scale 2f, a motor stator 2g and a motor rotor 2h. To be more specific, the workbench 2b is provided on an upper end portion of the air bearing upper platen 2c which is arranged on an upper end portion of the air bearing spindle 2a, and the air bearing spindle 2a is provided on an upper end portion of the air bearing lower platen 2d. The inductosyn sliding scale 2f is fitted to an outer ring of the air bearing lower platen 2d, and the inductosyn fixed scale 2e is fixed to a lower portion of an inner side of the central position of the base 1 and is located above the inductosyn sliding scale 2f. The motor stator 2g is fixed to the lower portion of the inner side the central position of the base 1 and is located below the inductosyn fixed scale 2e and outside the motor rotor 2h. The motor rotor 2h is fitted to the outer ring of the air bearing lower platen 2d and is located below the inductosyn sliding scale 2f. The air bearing system 2 drives the measured rotor to rotate at a uniform speed of 6 r/min to 10 r/min. The lower telescopic inductive sensor 9a can conduct sampling on an axial mounting datum plane of the measured rotor at equal intervals, and the lower lever-type inductive sensor 8a can conduct sampling on a radial mounting datum plane of the measured rotor at equal intervals. Particularly, the number of sampling points may fall within the range from 1000 to 2000 points per circle. A least square circle fitting may be performed on the sampling data of the radial mourning datum plane of the measured rotor so as to evaluate the eccentricity, and a least square plane fitting may be performed on the sampling data of the axial mounting datum plane of the measured rotor so as to evaluate the inclination. The center and inclination adjusting workbench 3 is provided at the central position of the air bearing system 2. According to the size and angle of the eccentricity, the center and inclination adjusting workbench 3 is adjusted until it is satisfied that the eccentricity of a radial datum plane is within the range of 0 to 3 μm. Likewise, according to the size and angle of the inclination, the center and inclination adjusting workbench 3 is adjusted until it is satisfied that the inclination of an axial datum plane is within the range of 0" to 2". The upper right column-rod connecting piece 7d is vertically fitted to an upper side of the right column 5b, and the upper right transverse measuring rod 6d is horizontally fitted to the upper right column-rod connecting piece 7d and is connected fixedly to the upper telescopic inductive sensor 9b which comes into contact with the axial mounting measurement surface of the measured rotor. The upper left column-rod connecting piece 7c is vertically fitted to an upper side of the left column 5a, and the upper left transverse measuring rod 6c, is horizontally fitted to the upper left column-rod connecting piece 7c and is connected fixedly to the upper lever-type inductive sensor 8b which comes into contact with the radial mounting measurement surface of the measured motor. The air bearing system 2 may rotate at a uniform speed of 6 r/min to 10 r/min, The upper telescopic inductive sensor 9b can conduct sampling on the axial mounting measurement surface of the measured rotor at equal intervals, and the upper lever-type inductive sensor 8b can conduct sampling on the radial mounting measurement surface of the measured rotor at equal intervals. It is noted that the number of sampling points may fall within the range from 1000 to 2000 points per circle. A least square circle fitting may be performed on the sampling data of the radial mounting measurement surface of the measured rotor by the upper lever-type inductive sensor 8b so as to evaluate concentricity, and a least square plane fitting may be performed on the sampling data of the axial mounting measurement suiface of the measured rotor by the upper telescopic inductive sensor 9b so as to evaluate perpendicularity. An influence weight value of the measured rotor on the coaxiality of the assembled rotors is obtained by combining the radius of the axial mounting measurement surface and the height difference between the measured rotor and the finally-assembled rotor. Further, all rotors required for assembly are measured respectively, so as to obtain the influence weight value of each rotor on the coaxiality of the assembled rotors. Vector optimization is then performed on the weight value of each rotor by means of a genetic algorithm, and an assembly angle of each rotor is obtained; the influence weight value of the coaxiality of the rotor is calculated according to the following equation:

$$CoaxWeight = CL\varphi - \frac{H}{R}PL\theta,$$

wherein C represents the concentricity of the radial mounting measurement surface of the measured rotor; φ represents the eccentric angle of a fitting center of circle of the radial mounting measurement surface; H represents the height difference between the measured rotor and the finally-assembled rotor; R represents the radius of the axial mounting measurement surface; P represents the perpendicularity of the axial mounting measurements surface of the measured rotor; and θ represents the angle at which the highest point of a fitting plane of the axial mounting measurement surface lies.

The invention claimed is:

1. A method for assembling a rotor of an aircraft engine, the method comprising:

fixing a measured rotor onto a center and inclination adjusting workbench;

making a telescopic inductive sensor for measuring an axial mounting datum plane of the measured rotor be in contact with the axial mounting datum plane of the measured rotor;

making a lever-type inductive sensor for measuring a radial mounting datum plane of the measured rotor be in contact with the radial mounting datum plane of the measured rotor;

driving the measured rotor to rotate at a uniform speed of 6 revolutions per minute (r/min) to 10 r/min by an air bearing turntable of the center and inclination adjusting workbench;

conducting sampling on the axial mounting datum plane of the measured rotor at equal intervals by the telescopic inductive sensor for measuring the axial mounting datum plane, and conducting sampling on the radial mounting datum plane of the measured rotor at equal intervals by the lever-type inductive sensor for measuring the radial mounting datum plane, wherein a number of sampling points falls within a range from 1000 to 2000 points per circle;

performing a least a square circle fitting on sampling data of the radial mounting datum plane of the measured rotor so as to evaluate an eccentricity and performing a least square plane fitting on sampling data of the axial mounting datum plane of the measured rotor so as to evaluate the inclination;

adjusting a center adjusting knob of the center and inclination adjusting workbench according to the size and angle of the eccentricity and adjusting an inclination adjusting knob of the center and inclination adjusting workbench according to the size and angle of the inclination until the center and inclination adjusting workbench is adjusted such that an eccentricity of a radial datum plane falls within a range of 0 to 3 micrometers (μm) and an inclination of an axial datum plane falls within a range from 0 to 2 inches (in.);

making a telescopic inductive sensor for measuring an axial mounting measurement surface of the measured rotor be in contact with the axial mounting measurement surface of the measured rotor, and making a lever-type inductive sensor for measuring a radial mounting measurement surface of the measured rotor be in contact with the radial mounting measurement surface of the measured rotor;

rotating the air bearing turntable at a uniform speed of 6 r/min to 10 r/min;

conducting sampling on the axial mounting measurement surface of the measured rotor at equal intervals by the telescopic inductive sensor for measuring the axial mounting measurement surface, and conducting sampling on the radial mounting measurement surface of the measured rotor at equal intervals by the lever-type inductive sensor for measuring the radial mounting measurement surface, wherein a number of sampling points falls within the range from 1000 to 2000 points per circle;

performing a least square circle fitting on sampling data of the radial mounting measurement surface of the measured rotor by the lever-type inductive sensor for measuring the radial mounting measurement surface so as to evaluate concentricity, and performing a least square plane fitting on sampling data of the axial mounting measurement surface of the measured rotor by the telescopic inductive sensor for measuring the axial mounting measurement surface so as to evaluate perpendicularity;

obtaining an influence weight value of the measured rotor on a coaxiality of an assembled rotor by combining a radius of the axial mounting measurement surface and a height difference between the measured rotor and the assembled rotor;

measuring all rotors required for assembly, respectively, to obtain the influence weight value of each rotor on the coaxiality of the assembled rotor; and performing vector optimization on the weight value of each rotor using an algorithm, and obtaining an assembly angle of each rotor, wherein the influence weight value of the coaxiality of the rotor is calculated according to the following equation:

$$CoaxWeight = C_L \varphi - \frac{H}{R} P_L \theta,$$

wherein C represents the concentricity of the radial mounting measurement surface of the measured rotor, $\varphi$ represents an eccentric angle of the fitting center of circle of the radial mounting measurement surface, H represents the height difference between the measured rotor and the assembled rotor, R represents the radius of the axial mounting measurement surface, P represents the perpendicularity of the axial mounting measurements surface of the measured rotor, and $\theta$ represents an angle at which the highest point of the fitting plane of the axial mounting measurement surface lies.

2. A device for assembling a rotor of aircraft engine, the device comprising:

an air bearing system fitted to a central position of a base, the air bearing system comprising an air bearing spindle, a workbench, an air bearing upper platen, an air bearing lower platen, an inductosyn fixed scale, an inductosyn sliding scale, a motor stator and a motor rotor, wherein:

the workbench is located on an upper end portion of the air bearing upper platen which is arranged on an upper end portion of the air bearing spindle;

the air bearing spindle is located on an upper end portion of the air bearing lower platen;

the inductosyn sliding scale is fitted to an outer ring of the air bearing lower platen and the inductosyn fixed scale is fixed to a lower portion of an inner side of the central position of the base and is located above the inductosyn sliding scale;

the motor stator (2g) is fixed to the lower portion of the inner side of the central position of the base and is located below the inductosyn fixed scale and outside the motor rotor;

the motor rotor is fitted to the outer ring of the air bearing lower platen and is located below the inductosyn sliding scale;

a center and inclination adjusting workbench located at a central position of the air bearing system;

a three-jaw electric chuck arranged in a central position of the center and inclination adjusting workbench;

a left motion guide rail and a right motion guide rail symmetrically distributed on the base at two sides of the air bearing system;

a left column mounted on the left motion guide rail, and a right column mounted on the right motion guide rail;

an upper left column-rod connecting piece and a lower left column-rod connecting piece fitted to the left column sequentially from top to bottom and can be movably adjusted;

an upper left transverse measuring rod horizontally fitted to the upper left column-rod connecting piece and connected fixedly to an upper lever-type inductive sensor;

a lower left transverse measuring rod horizontally fitted to the lower left column-rod connecting piece and connected fixedly to a lower lever-type inductive sensor;

an upper right column-rod connecting piece and a lower right column-rod connecting piece fitted to the right column sequentially from top to bottom and can be movably adjusted;

an upper right transverse measuring rod horizontally fitted to the upper right column-rod connecting piece and connected fixedly to an upper telescopic inductive sensor; and a lower right transverse measuring rod horizontally fitted to the lower right column-rod connecting piece and connected fixedly to a lower telescopic inductive sensor.

* * * * *